United States Patent
Magno

(10) Patent No.: US 9,271,599 B2
(45) Date of Patent: Mar. 1, 2016

(54) INFUSION ASSEMBLY

(75) Inventor: Alessandro Magno, Brembate Sopra (IT)

(73) Assignee: N & W Global Vending S.p.A., Valbrembo (IT)

(*) Notice: Subject to any disclaimer, the term of this patent is extended or adjusted under 35 U.S.C. 154(b) by 714 days.

(21) Appl. No.: 13/636,108

(22) PCT Filed: Mar. 19, 2010

(86) PCT No.: PCT/IB2010/000595
§ 371 (c)(1),
(2), (4) Date: Dec. 26, 2012

(87) PCT Pub. No.: WO2011/114179
PCT Pub. Date: Sep. 22, 2011

(65) Prior Publication Data
US 2013/0092031 A1 Apr. 18, 2013

(51) Int. Cl.
*A47J 31/40* (2006.01)
*A47J 31/36* (2006.01)

(52) U.S. Cl.
CPC .............. *A47J 31/36* (2013.01); *A47J 31/3633* (2013.01); *A47J 31/3638* (2013.01); *A47J 31/3676* (2013.01)

(58) Field of Classification Search
CPC .............. A47J 31/3638; A47J 31/3676; A47J 31/3623; A47J 31/368; A47J 31/369
USPC ...................................... 99/302 P, 295, 289 R
See application file for complete search history.

(56) References Cited

U.S. PATENT DOCUMENTS

| | | | |
|---|---|---|---|
| 5,755,149 A * | 5/1998 | Blanc et al. | 99/289 T |
| 6,584,888 B2 * | 7/2003 | Cortese | 99/289 R |
| 7,059,239 B2 | 6/2006 | Balkau | |
| 7,066,079 B2 | 6/2006 | Sager | |
| 7,350,456 B2 * | 4/2008 | Blanc et al. | 99/302 P |
| 7,562,618 B2 | 7/2009 | Jarisch et al. | |
| 8,770,095 B2 | 7/2014 | Pecci et al. | |
| 8,904,922 B2 * | 12/2014 | Pagano | 99/295 |
| 2006/0075902 A1 | 4/2006 | Magno | |
| 2009/0007794 A1 * | 1/2009 | Cortese | 99/289 R |

FOREIGN PATENT DOCUMENTS

| | | | |
|---|---|---|---|
| CN | 1647730 A | 8/2005 | |
| CN | 1747676 A | 3/2006 | |
| CN | 1953687 A | 4/2007 | |
| CN | 101610703 A | 12/2009 | |
| EP | 1 444 932 A1 | 8/2004 | |
| EP | 1 980 183 A2 | 10/2008 | |

(Continued)

*Primary Examiner* — Reginald L Alexander
(74) *Attorney, Agent, or Firm* — Dickstein Shapiro LLP

(57) ABSTRACT

An infusion assembly, wherein a piston is positioned facing an open end of a cup, and is movable along a first axis to insert a container of powdered material into the cup; the container having been arrested, in use, by a gripper-type stop device in a position coaxial with the first axis and inside a through channel interposed between the piston and the cup; the gripper-type stop device being movable with and by the piston to perform a work movement towards the cup; and the cup having a second axis, and being mounted to oscillate, about a third axis perpendicular to the first axis, between a normal unloading position, in which the open end of the cup faces downwards, and a work position, in which the second axis is coaxial with the first axis.

10 Claims, 4 Drawing Sheets

(56) References Cited

FOREIGN PATENT DOCUMENTS

| EP | 1980183 | A2 | 10/2008 |
| EP | 2 044 867 | A1 | 4/2009 |
| EP | 2044867 | A1 | 4/2009 |
| WO | WO 2004/049878 | A1 | 6/2004 |

* cited by examiner

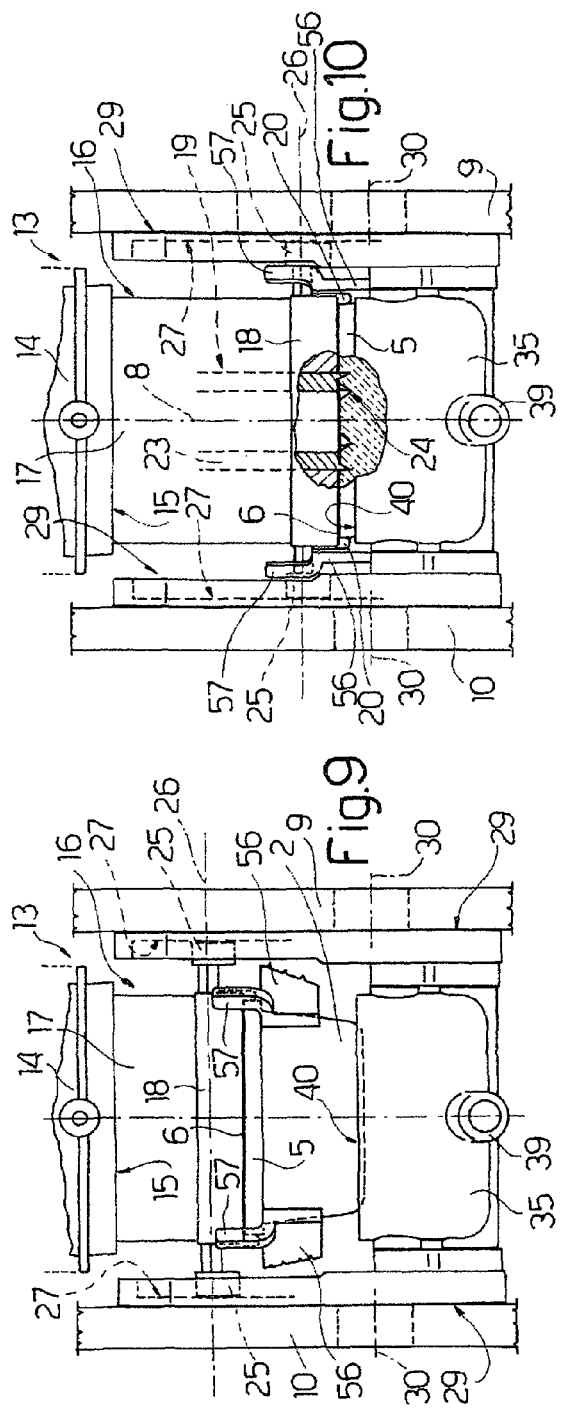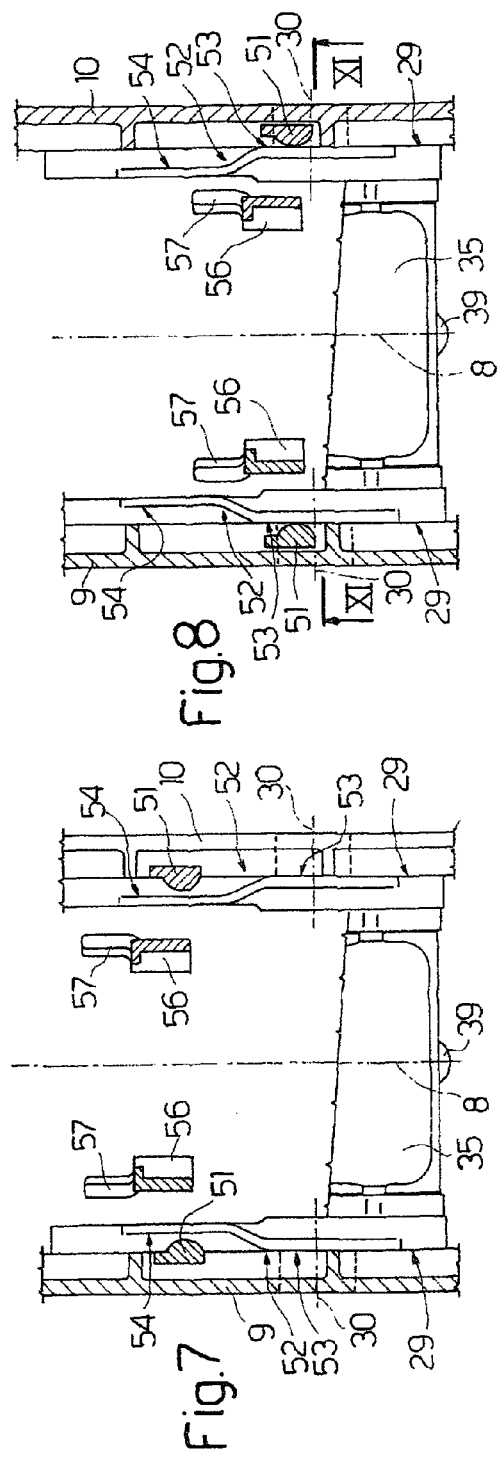

INFUSION ASSEMBLY

TECHNICAL FIELD

The present invention relates to an infusion assembly for making a brewed beverage from material housed inside a disposable container.

1. Background Art

Though suitable for making any type of beverage, the present invention is particularly advantageous for use in coffee machines employing ground-coffee containers, such as wafers or capsules, to which the following description refers purely by way of example.

2. Disclosure of Invention

It is an object of the present invention to provide an infusion assembly that is cheap and easy to produce, and at the same time unloads the used container automatically.

According to the present invention, there is provided an infusion assembly as claimed in claim 1 and preferably in any one of the following Claims depending directly or indirectly on claim 1.

BRIEF DESCRIPTION OF THE DRAWINGS

A non-limiting embodiment of the invention will be described by way of example with reference to the accompanying drawings, in which:

FIG. 6 shows a section along line VI-VI in FIG. 1;

FIG. 7 shows a section along line VII-VII in FIG. 6;

FIG. 8 shows the same section as in FIG. 7 but a different operating configuration;

FIG. 9 shows a larger-scale underside plan view of a detail in FIG. 4;

FIG. 10 shows a larger-scale underside plan view of a detail in FIG. 5;

FIG. 11 shows a section along line XI-XI in FIG. 8.

BEST MODE FOR CARRYING OUT THE INVENTION

Figure 1:
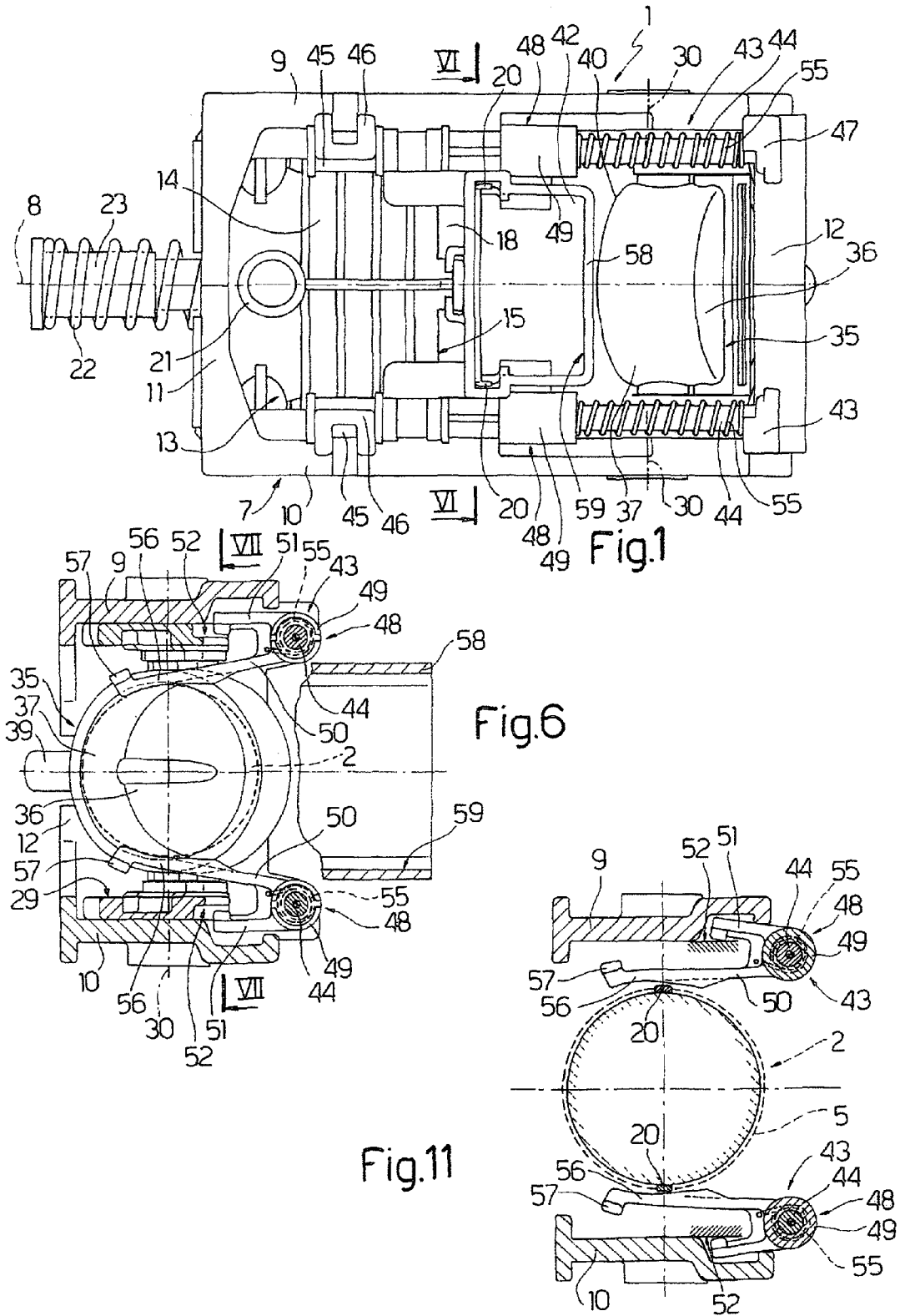
FIGS. 1 and 2 show topside and underside plan views respectively of a preferred embodiment of the infusion assembly according to the present invention.

Number 1 in FIG. 1 indicates as a whole an infusion assembly for coffee machines employing sealed, substantially truncated-cone-shaped capsules 2 (FIG. 3), each containing a measure of ground coffee, and each comprising a cup-shaped body 3, which is closed at its narrow end by an end wall 4, and has, at its wide end, an outer flange 5, and a seal defined by a sheet 6 of foil material sealed along its edge to flange 5.

Infusion assembly 1 comprises a rectangular-parallelepiped-shaped frame 7 having a longitudinal axis 8 and defined by two longitudinal walls 9, 10 parallel to each other and to axis 8, and by two parallel transverse walls 11, 12 crosswise to axis 8 and connecting longitudinal walls 9 and 10.

Though axis 8 may slope more or less with respect to the horizontal, the following description refers to a preferred embodiment, in which axis 8 is horizontal, and each of longitudinal walls 9, 10 and transverse walls 11, 12 is vertical, and so has a top edge and a bottom edge.

Infusion assembly 1 also comprises a hydraulic cylinder 13, in turn comprising a fixed, substantially cylindrical, cup-shaped outer body 14, which is located between longitudinal walls 9 and 10, coaxially with axis 8, has an end wall contacting transverse wall 11, is fixed laterally integral with longitudinal walls 9, 10, and therefore with frame 7, by means of external pins crosswise to axis 8, and is positioned with its open end 15 facing transverse wall 12.

Hydraulic cylinder 13 also comprises a telescopic piston 16 mounted to slide axially inside outer body 14, and in turn comprising a first stage 17, an annular end plate 18 of which projects from outer body 14 and is larger in diameter than the inside diameter of outer body 14; and a second stage 19 fitted through a central hole in plate 18 and coaxial with axis 8. Along its outer edge, plate 18 has a number of (in the example shown, two) axial locating appendixes 20 facing transverse wall 12 and located along a circle approximately equal to but no smaller in diameter than flange 5 of capsule 2.

Hydraulic cylinder 13 is designed, in known manner, so that pressurized fluid entering outer body 14 from a radial fitting 21 moves first and second stages 17, 19 simultaneously, and in opposition to a spring 22, towards transverse wall 12 from a withdrawn rest position, in which plate 18 contacts the open end 15 of outer body 14. Spring 22 is fitted to a longitudinal rod extending along axis 8 from second stage 19 and through transverse wall 11, and is compressed between transverse wall 11 and an end plate on rod 23.

When the axial movement of first stage 17 is brought to a halt, second stage 19 continues moving, in opposition to spring 22, so that a ring of piercing tips 24, located on the end of second stage 19 facing transverse wall 12, and for piercing sheet 6 of capsule 2, projects from plate 18 towards transverse wall 12.

Figure 3:
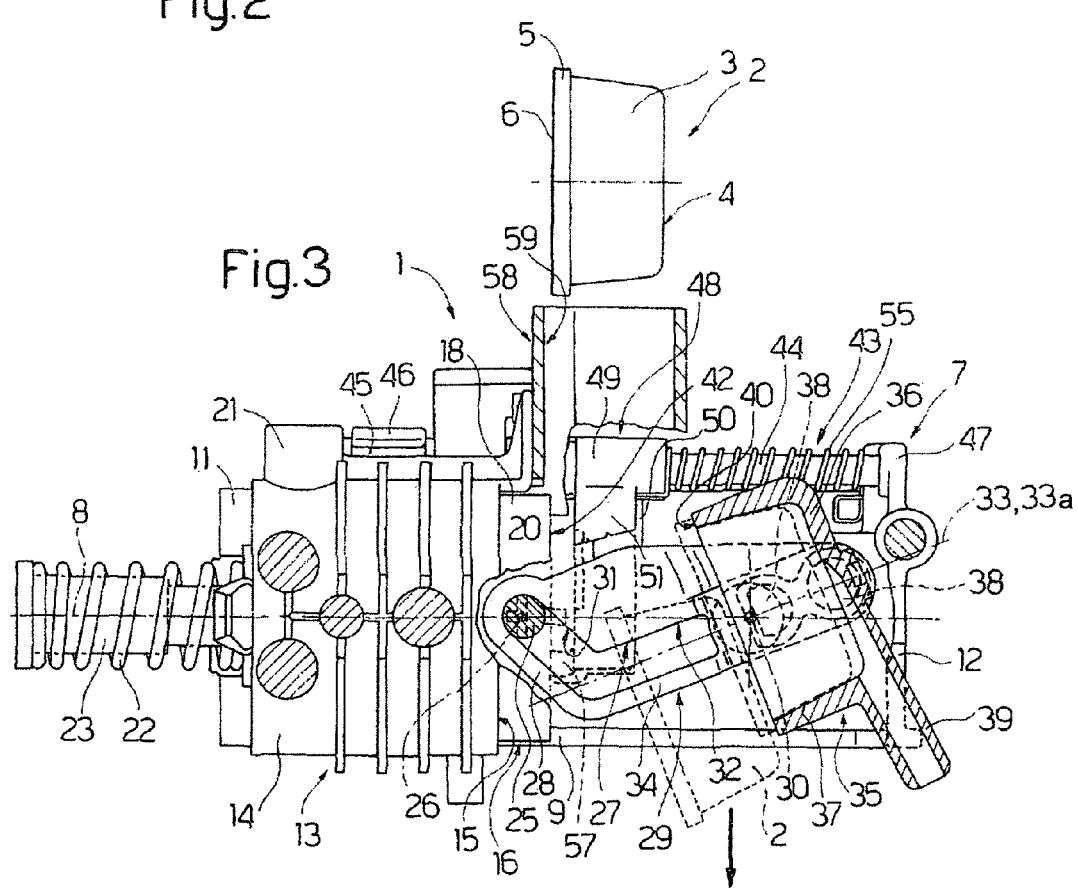
FIGS. 3 to 5 show partly sectioned side views of the FIGS. 1 and 2 infusion assembly in respective different operating configurations.
Figure 4:
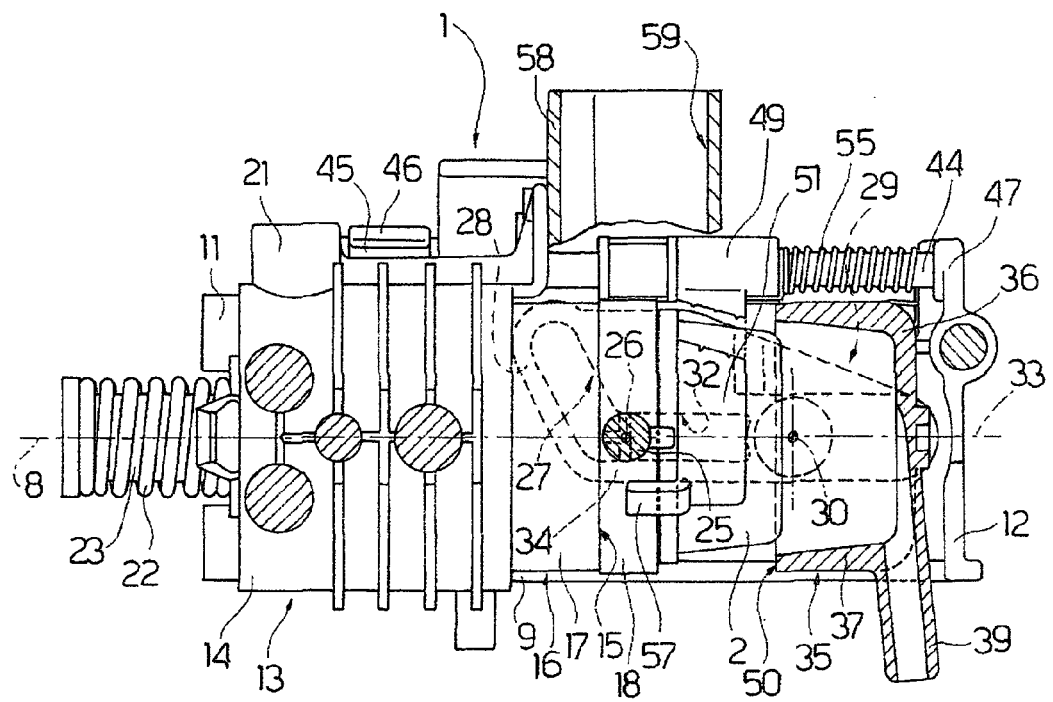
Figure 5:
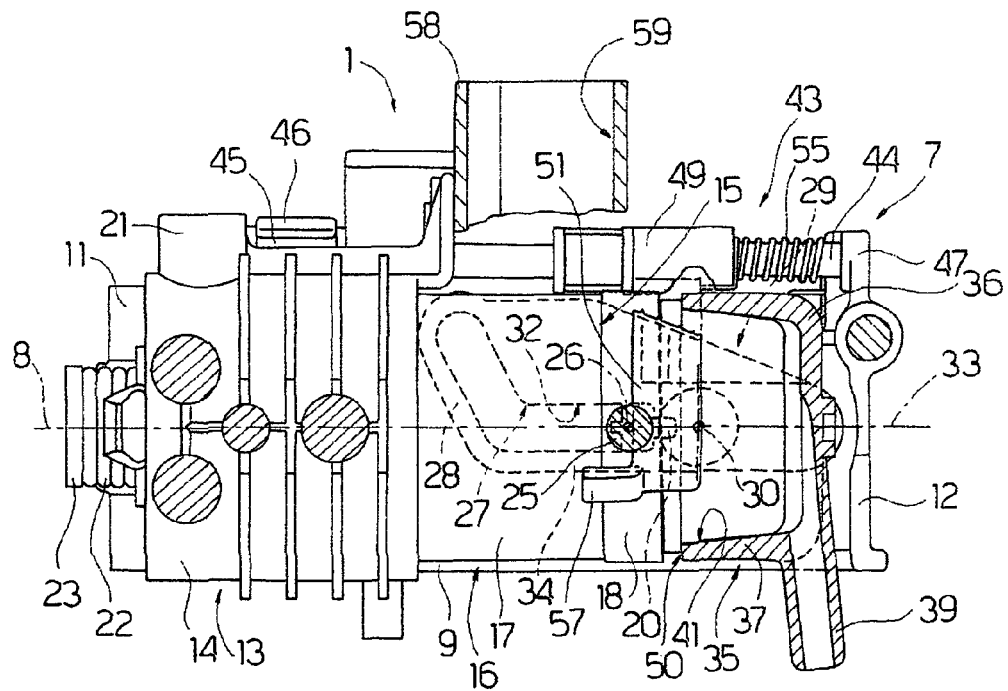

As shown in FIGS. 3 to 5, plate 18 has two radial follower pins 25, which are coaxial along a horizontal axis 26 perpendicular to axis 8 and to longitudinal walls 9 and 10, and are movable with plate 18 to and from transverse wall 12 along a plane defined at all times by axes 8 and 26. Each pin 25 engages and slides transversely along a respective track 27 formed along a first arm 28 of a respective rocker arm 29, which is located between longitudinal walls 9 and 10, and is connected to relative longitudinal wall 9, 10 to rotate with respect to it about a fixed axis 30 perpendicular to axis 8, parallel to axis 26, and located between plate 18 and transverse wall 12.

Each track 27 extends in a respective plane perpendicular to axis 30, and comprises two branches 31 and 32 connected to form a V with its concavity facing substantially upwards, and of which branch 32, facing axis 30, is longer than branch 31 and has an axis 33 perpendicular to axis 30. Each pin 25 moves along respective track 27 from a rest position (FIG. 3), in which plate 18 is in the withdrawn rest position contacting open end 15 of outer body 14, pin 25 occupies one end of respective track 27, and both branches 31 and 32 are located below the plane defined by axes 8 and 30. Movement of each pin 25 from the rest position described causes relative rocker arm 29 to rotate (clockwise in FIGS. 3 to 5) from a start position (FIG. 3)—in which axis 33 and the axis 33 of the other rocker arm 29 define a plane, which intersects, along axis 30, the plane defined by axes 8 and 30, and slopes downwards from axis 30—to an end position (FIG. 4)—assumed upon pin 25 engaging branch 32 of respective track 27, and in which the plane defined by axes 33 is coplanar with the plane defined by axes 8 and 30.

Each rocker arm 29 comprises a second arm 34, which extends coaxially with relative axis 33 and is fitted with a cup 35 for receiving capsule 2. More specifically, cup 35 is interposed between the second arms 34, and has an end wall 36 facing transverse wall 12 and perpendicular to axes 33; and a lateral wall 37, which has an axis 33a (FIG. 3) coplanar with the plane defined by axes 33, and is connected to each second arm 34 by two parallel pins 38 whose axes lie in the plane defined by axes 33. Consequently, when rocker arms 29 are in the start position, cup 35 is positioned with its axis sloping downwards; and, when rocker arms 29 are in the end position, cup 35 is positioned coaxial with axis 8, and with a spout 39, projecting outwards of lateral wall 37, facing substantially vertically downwards.

End wall 36 and lateral wall 37 of cup 35 define a seat deeper than the length of capsule 2; and lateral wall 37 has a free edge 40 facing plate 18 and which, when capsule 2 is inserted inside cup 35 with sheet 6 facing plate 18, and telescopic piston 15 is moved towards transverse wall 12, cooperates with the surface of flange 5 facing end wall 4 to grip flange 5 in fluidtight manner against plate 18 and define, with plate 18, an infusion chamber 41 communicating externally through spout 39.

When rocker arms 29 are in the start position, cup 35, sloping downwards on one side, and plate 18, in the rest position on the other side, define between them, inside frame 7, a through channel 42 along which capsule 2 travels through infusion assembly 1, which comprises a stop device 43 for temporarily arresting and supporting capsule 2, along through channel 42, in an infusion position coaxial with axis 8.

Stop device 43 comprises two rods 44 parallel to axis 8, and each located above the top edge of relative longitudinal wall 9, 10, and directly over relative rocker arm 29. The end of each rod 44 facing transverse wall 11 is fitted with a sleeve 45, which clicks onto a respective bracket 46 projecting upwards from the top edge of relative longitudinal wall 9, 10, alongside outer body 14 of hydraulic cylinder 13. The end of each rod 44 facing transverse wall 12 engages a hole formed in a respective bracket 47 projecting upwards from the top edge of transverse wall 12.

For each rod 44, stop device 43 comprises a rocker arm 48, in turn comprising a central portion defined by a sleeve 49 fitted in rotary and axially-sliding manner to relative rod 44; and two arms 50, 51 extending downwards. Arm 50 extends along through channel 42 and inwards of relative rocker arm 29; and arm 51 extends outwards of relative rocker arm 29, and is fitted on its free end with a follower mounted to slide along a track 52 formed on the surface of first arm 28 of relative rocker arm 29 facing relative longitudinal wall 9, 10.

As shown more clearly in FIGS. 7 and 8, each track 52 comprises a first portion 53 closer to transverse wall 11 and located a first distance from axis 8; and a second portion 54 closer to transverse wall 12 and located a second distance, smaller than the first distance, from axis 8. The follower on each arm 51 is held contacting relative track 52 by a coil spring 55, which is fitted to relative rod 44, is compressed axially between relative sleeve 49 and relative bracket 47 to keep relative sleeve 49 in contact with the end of relative sleeve 45, and is compressed torsionally to move relative arm 50 towards axis 8 and the other arm 50.

Figure 2:
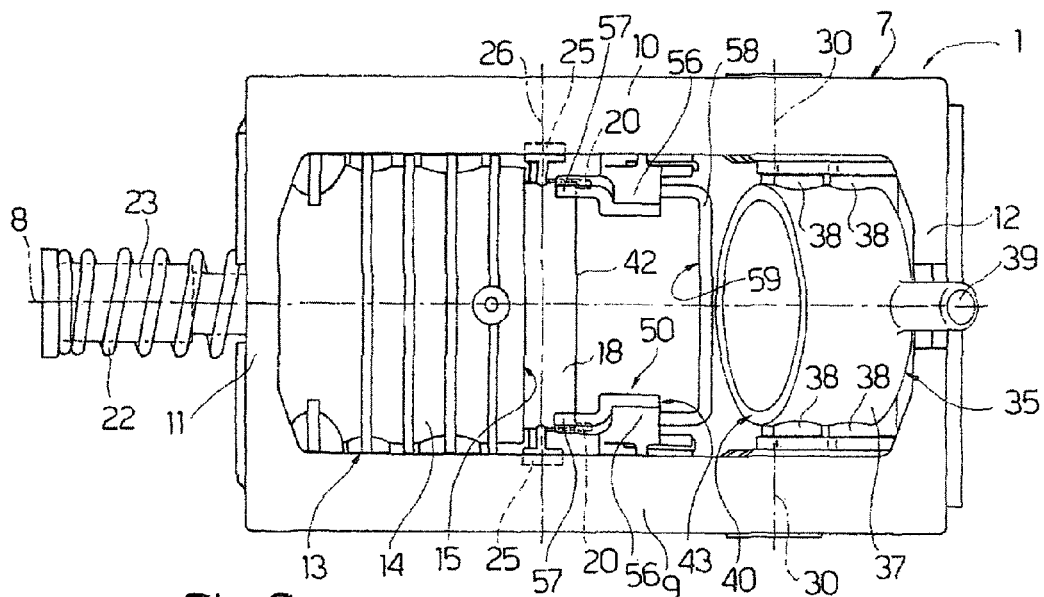

As shown more clearly in FIG. 2, each arm 50 has a sickle-shaped end portion 56, which extends, at rest, inside through channel 42, and has an appendix 57 projecting from sickle-shaped portion 56 towards transverse wall 11. When plate 18 is in the withdrawn rest position contacting open end 15 of outer body 14 of hydraulic cylinder 13, arms 50 are positioned, inside through channel 42, facing and substantially contacting plate 18, and appendixes 57 are positioned, by springs 55, contacting the lateral wall of plate 18 to keep sickle-shaped portions 56 in such a position as to surround a capsule 2 fed downwards into through channel 42, and hold capsule 2 in the infusion position.

Capsule 2 is fed downwards into through channel 42 by a tubular body 58, which is fitted to frame 7, over through channel 42, and defines a vertical feed channel 59 for feeding capsule 2 into through channel 42.

The invention claimed is:

1. An infusion assembly comprising a cup for receiving a container of powdered material; a piston facing an open end of the cup and movable along a first axis to perform a work stroke, to and from the cup, between a withdrawn rest position, in which the piston defines, with the cup, a channel crosswise to the first axis and for passage of the container, and an extracted work position, in which the piston cooperates with the cup to define an infusion chamber for receiving the container and through which pressurized fluid from a fluid source is fed; and stop means located in front of the piston to intercept the container along the channel, and arrest the container in a position coaxial with the first axis; the stop means being movable with the piston to perform a work movement towards the cup; and the cup having a second axis, and being mounted to oscillate, about a third axis perpendicular to the first axis, between a normal unloading position, in which the open end of the cup faces downwards, and a work position, in which the second axis is coaxial with the first axis; and transmission means being interposed between the cup and the piston to swing the cup from the unloading position to the work position, when the piston moves into the extracted work position; wherein the transmission means comprises at least one lever arm integral with the cup and which rotates together with the cup about the third axis; a track formed along the lever arm; and a pin projecting radially from the piston and engaging the track in transversely sliding manner.

2. An infusion assembly as claimed in claim 1, wherein the stop means are gripper stop means.

3. An infusion assembly as claimed in claim 1, wherein the track is V-shaped, and comprises a first and a second branch; the second branch extending along a fourth axis parallel to the second axis and perpendicular to the third axis; and the fourth axis being positioned, with the second axis, coplanar with a plane defined by the first and third axis, when the pin of the piston engages the second branch as the piston moves into the extracted work position.

4. An infusion assembly as claimed in claim 1, and comprising guide means extending parallel to the first axis and for guiding the stop means in their work movement; elastic means being provided to impart to the stop means a return movement opposite the work movement.

5. An infusion assembly as claimed in claim 1, wherein the work stroke of the piston is longer than the work movement of the stop means.

6. An infusion assembly as claimed in claim 5, and comprising elastic means to impart to the stop means a return movement opposite the work movement; and cam means cooperating with the stop means to open the stop means and release them from the piston at the end of their work movement, so as to allow the return movement of the stop means by the elastic means.

7. An infusion assembly as claimed in claim 6, wherein the cam means are formed along the transmission means.

8. An infusion assembly as claimed in claim 7, wherein the cam means are designed to open the stop means and to interrupt the work movement of the stop means, when the pin of the piston substantially reaches the intersection of the first and second branch of the track, as the piston performs its work stroke towards the cup.

9. An infusion assembly as claimed in claim 1, wherein the piston is a telescopic piston comprising a first stage, which engages the stop means to impart said work movement to the stop means; and a second stage having piercing means for piercing said container.

11. An infusion assembly as claimed in claim 1, wherein the first and second axis are substantially horizontal.

* * * * *